Dec. 19, 1967
H. W. ATTEBERY
3,358,430
COTTON HARVESTER
Filed Oct. 23, 1964
5 Sheets-Sheet 1
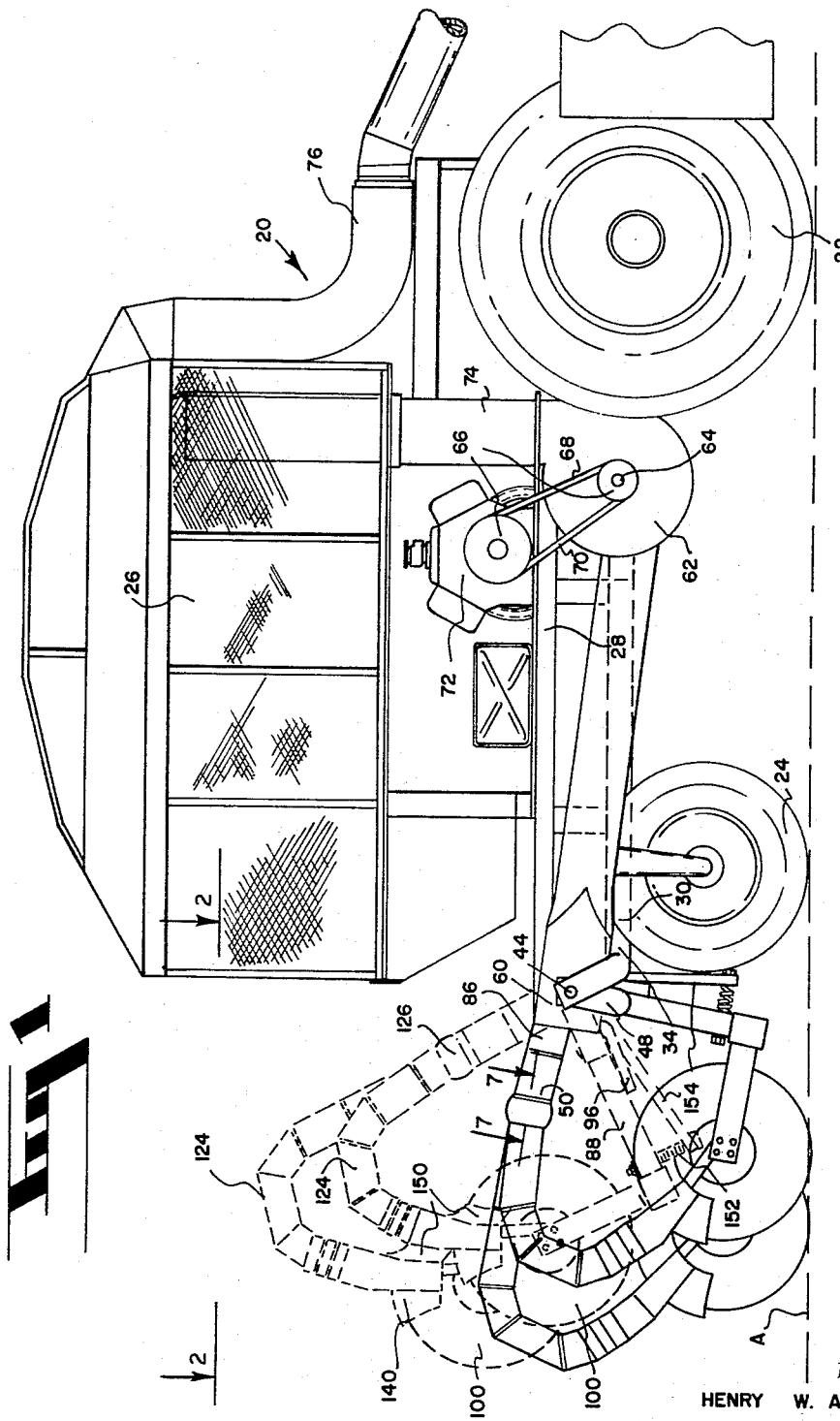
INVENTOR.
HENRY W. ATTEBERY
BY
Wm. H. Dean

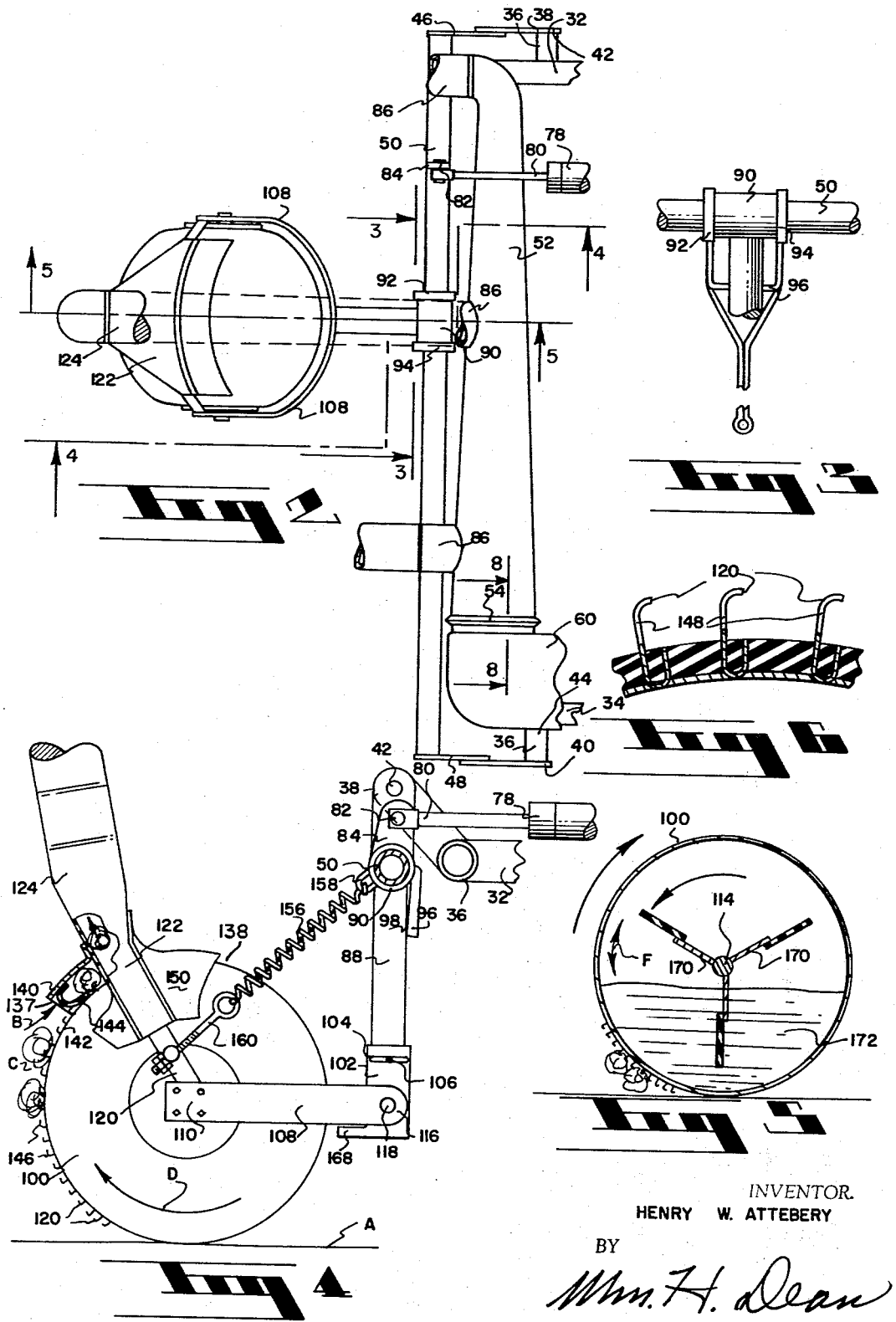

Dec. 19, 1967  H. W. ATTEBERY  3,358,430
COTTON HARVESTER
Filed Oct. 23, 1964  5 Sheets-Sheet 3
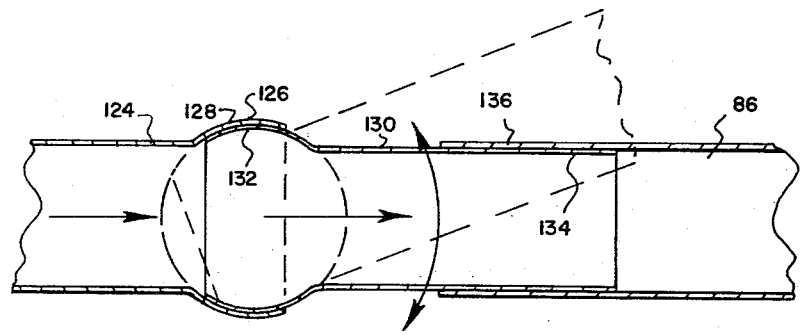
Fig. 7
Fig. 8
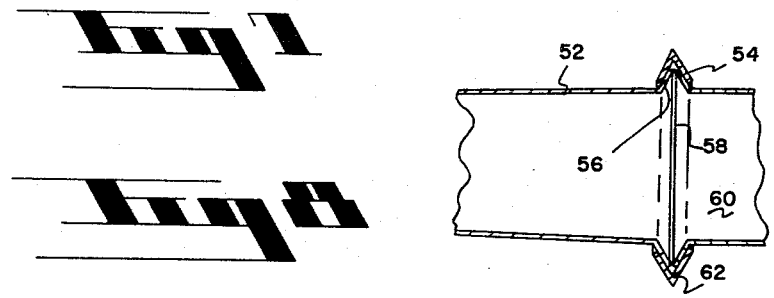
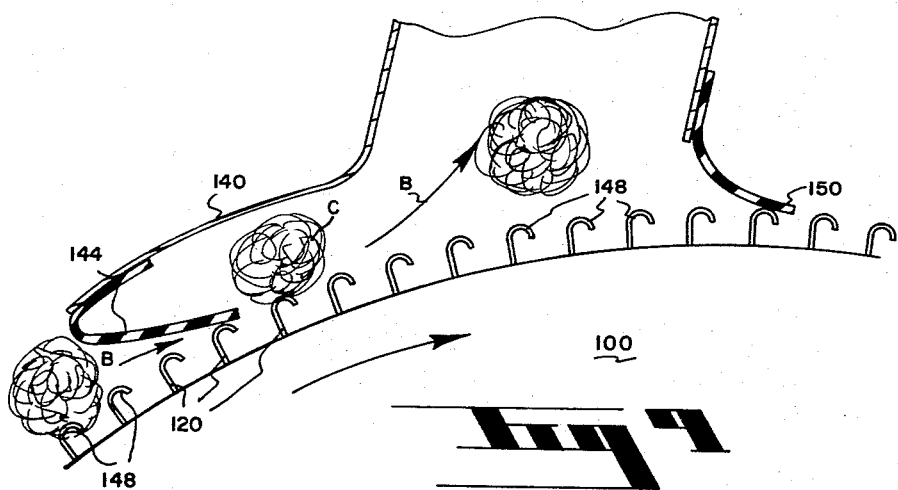
Fig. 9
INVENTOR.
HENRY W. ATTEBERY
BY
Wm. H. Dean

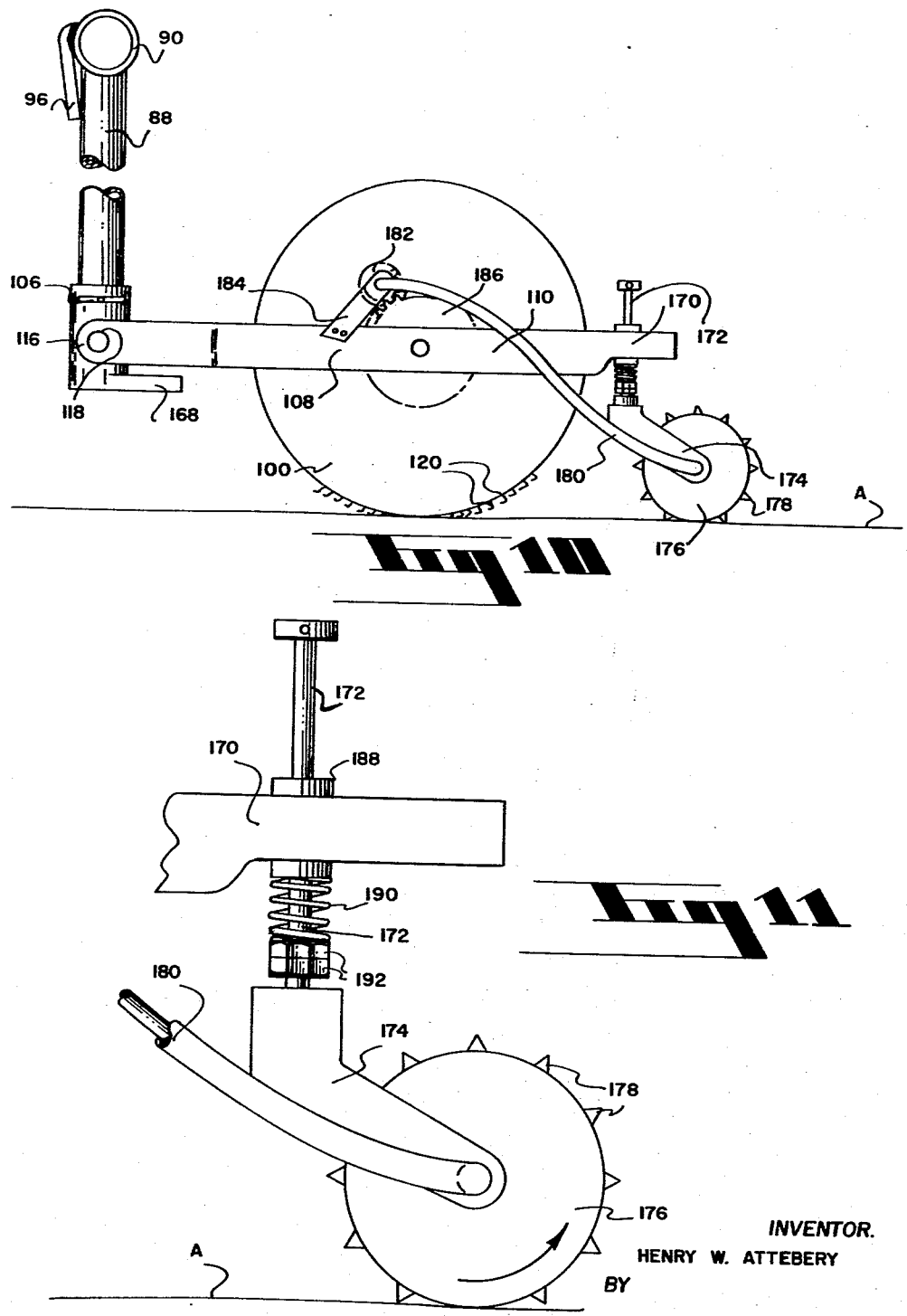

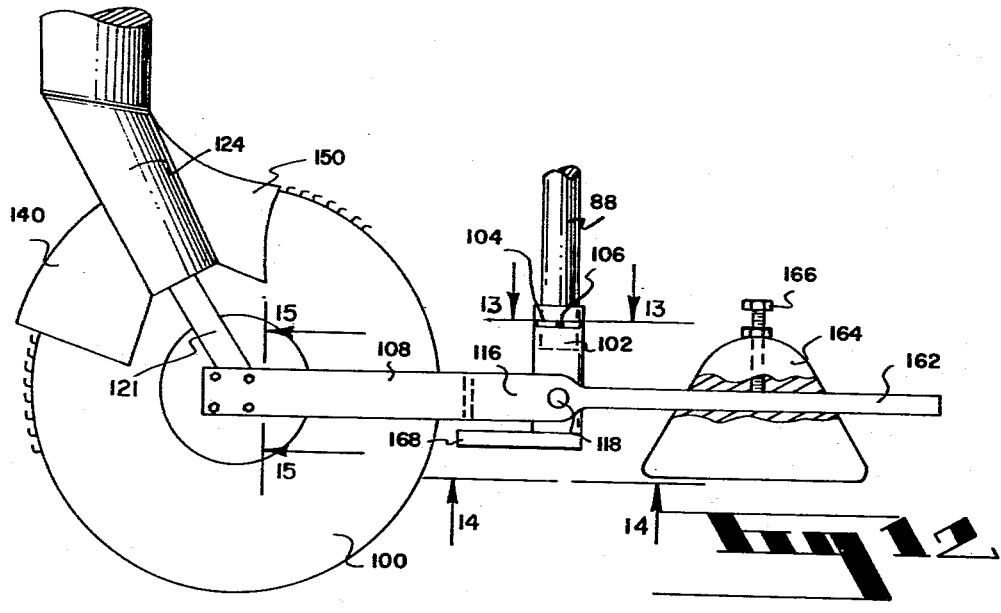
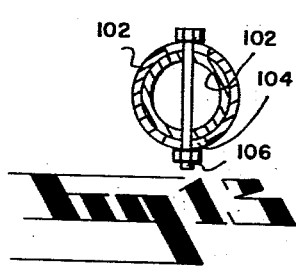
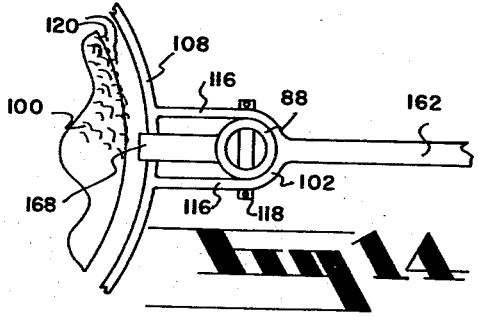
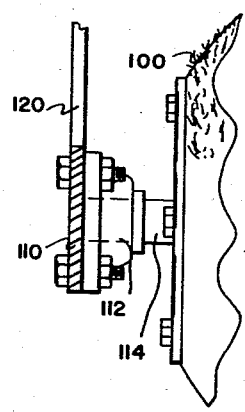
INVENTOR.
HENERY W. ATTEBERY

# United States Patent Office 3,358,430
Patented Dec. 19, 1967

3,358,430
COTTON HARVESTER
Henry W. Attebery, Phoenix, Ariz.
Filed Oct. 23, 1964, Ser. No. 405,911
10 Claims. (Cl. 56—28)

This invention relates to a cotton harvester and more particularly to a cotton harvester having ground engaging cotton pick up roller means adapted to gather cotton which has matured and fallen to the ground.

This application discloses improvements in cotton harvesters with relation to my copending application, Ser. No. 304,738, filed Aug. 26, 1963 and now Patent 3,324,640.

During the growth of cotton plants and the maturity of cotton thereon, cotton bolls progressively produce mature cotton generally from the ground upward. The lower limbs usually produce mature cotton before bolls of cotton mature on the upper limbs. Accordingly, during the cotton harvesting period, some of the cotton matures quite early and falls to the ground and during the actual harvesting of mature cotton from the cotton plants, some of the mature cotton is displaced from the plant and it falls to the ground, all of which requires that a substantial percentage of the mature cotton must be harvested from the surface of the ground.

Various prior art machines have been used to harvest or glean cotton from the surface of the ground and some of these machines employ vacuum pick up nozzles which apply suction in close proximity to the surface of the ground, thereby vacuumatically removing cotton from the ground. These devices also remove leaves, sticks and a great deal of dust and dirt. The foreign matter, thus, picked up by vacuumatic devices substantially lowers the grade of the cotton and imposes high ginning costs with respect to the ginning of the cotton after it has been harvested.

Other prior art machines utilize devices having slotted belts which pinch the cotton and thereby grasp is in the operation of removing the cotton from the ground. These devices which grasp the cotton at the surface of the ground also grasp small limbs, leaves, grass and other foreign matter as well as rocks and other undesirable material. Such machines also pick up a great variety of foreign matter and thereby lower the grade of the cotton and impose high costs in the ginning of the cotton after it has been harvested.

In accordance with the above identified patent application and in accordance with the present invention, a roller having fibrous cotton impaling elements on its periphery, is rolled along the surface of the ground and operated in a manner to cause the fibrous impaling elements to pick up cotton whereupon it is elevated from the ground and drawn vacuumatically into a collector hood from which it is delivered into the storage basket of a cotton harvester or the like.

In the operation of rollers having cotton impaling fibers on the periphery thereof, it has been found that the contact surfaces of the rollers at their periphery, when heavily loaded, may cause damage to delicate fibrous cotton impaling elements. As for example, those firbous elements which may range in diameter from 10 to 20 thousandths of an inch.

Such fibrous elements made of nylon or other semi-flexible material may eventually be deflected to a permanent set condition so that the direction of the fibers is not compatible with proper impaling operations and consequently, heavily loaded rollers tend to damage the fibers by deflecting them or substantially flattening the fibers in such a manner that they are not properely directed outwardly to impale cotton fibers as the roller rolls on the ground. It will be appreciated that the weight of such rollers relative to the disposition and proportions of the cotton impaling fibers may be critical to the longevity of the cotton impaling elements and further, it has been found that a roller which bears heavily on the surface of the ground, may tend to force fibrous cotton impaling elements to pick up a substantially greater amount of foreign matter than when the roller is relatively lightly loaded with respect to the surface of the ground. Accordingly, it is an object of the present invention to provide a cotton harvester comprising a roller adapted to roll adjacent to the surface of the ground; said roller having fibrous cotton impaling elements on its periphery adapted to impale cotton fibers lying on the ground; said roller having means disposed to support it relative to the surface of the ground so that the periphery of said roller is very lightly loaded against the upper surface of the ground providing a very delicate relation between the cotton impaling fibers and cotton on the surface of the ground, whereby the cotton impaling elements merely impale and pick up fine cotton fibers without being forced into the soil and/or other foreign matter at the surface of the ground.

Another object of the invention is to provide a cotton harvester having a roller provided with fibrous cotton impaling elements on its periphery; said roller adapted to roll adjacent the surface of the ground and having means disposed to partially support the weight of the roller so that the periphery of the roller is very lightly loaded with respect to the surface of the ground, thereby alleviating the tendency of the fibrous cotton impaling elements to be crushed or unduly distorted or worn or for these elements to become matted during continued rolling action of the roller on the ground.

Another object of the invention is to provide a cotton harvester having a roller adapted to roll adjacent the surface of the ground and having cotton impaling elements projecting from the periphery thereof and having ends directed backwardly with respect to the forward motion of the roller, as it traverses the ground; a vacuum conducting hood disposed adjacent the periphery of the roller in a position to operate above the ground wherein the pointed ends of said cotton impaling elements are directed as the roller rotates with respect to the hood, whereby the flow of air induced by vacuum in the hood causes the cotton to be removed from said cotton impaling elements in a direction opposite to that in which the ends of the elements are pointed.

Another object of the invention is to provide a novel vacuum manifold and conduit means for use in connection with elevatable ground engaging cotton harvesting rollers.

Another object of the invention is to provide a novel vacuum cotton collector hood means for use in removing cotton from the periphery of ground engaging cotton harvesting rollers.

Another object of the invention is to provide a novel weight balancing means for use in partially supporting the weight of ground engaging cotton harvesting rollers to prevent damage to the peripherally disposed cotton impaling elements on such rollers and also to prevent undue pressure of said rollers on the surface of the ground and thereby alleviate the tendency of such rollers to pick up an undue amount of foreign matter which is undesirable with respect to the gathering of cotton from the ground.

Another object of the invention is to provide a novel means for causing rotative movement of the periphery of the cotton harvesting roller relative to the ground in order to cause pointed ends of fibrous cotton impaling elements on the periphery of the roller to impale bolls of cotton and cotton fibers on the ground.

Another object of the invention is to provide a novel means for causing oscillatory movement of the periphery of the cotton harvesting roller relative to the ground and to cotton bolls thereon, whereby pointed ends of fibrous cotton impaling elements may be caused efficiently to impale cotton bolls and fibers on the ground so that they may readily be picked up on the periphery of the roller.

Another object of the invention is to provide a novel ground engaging rotor support for a cotton harvesting roller adapted to roll adjacent the surface of the ground and to provide means in connection with the ground engaging rotor for rotating the cotton harvesting roller in a manner compatible with the rolling action of the roller and the forward movement of a connected vehicle relative to the surface of the ground.

Further objects and advantages of the invention may be apparent from the following specification, appended claims and accompanying drawings, in which:

FIG. 1 is a side elevational view of a cotton harvester in accordance with the present invention and showing ground engaging cotton harvesting rollers in solid lines and broken lines with respect to the surface of the ground;

FIG. 2 is a slightly enlarged fragmentary plan view taken from the line 2—2 of FIG. 1;

FIG. 3 is a fragmentary rear elevational view taken from the line 3—3 of FIG. 2;

FIG. 4 is an enlarged fragmentary sectional view taken from the line 4—4 of FIG. 2 and showing generally cotton gathering roller support structure, as shown in FIGS. 1 and 2, but illustrating a modification of a spring balance mechanism disposed partially to bear the weight of the roller and connected mechanism so that the roller may bear lightly on the ground;

FIG. 5 is a fragmentary sectional view taken from the line 5—5 of FIG. 2, showing roller oscillating means disposed to oscillate the ground engaging roller of the invention to cause cotton impaling elements on the periphery of the roller to impale bolls of cotton on the ground;

FIG. 6 is an enlarged fragmentary sectional view of a peripheral portion of a cotton harvesting roller of the invention, showing cotton impaling fiber elements projecting from the periphery of the roller and having ends oriented in a direction to be pointed backwardly with respect to the forward rolling direction of the tire, when in operation;

FIG. 7 is an enlarged fragmentary sectional view taken from the line 7—7 of FIG. 1;

FIG. 8 is an enlarged fragmentary sectional view taken from the line 8—8 of FIG. 2, showing a swivel joint of a vacuum conducting manifold of the invention;

FIG. 9 is an enlarged fragmentary sectional view of a ground engaging cotton harvesting roller having peripherally disposed cotton impaling fibers having ends oriented in a direction of rotation with respect to a vacumatic cotton collector hood structure;

FIG. 10 is a side elevational view of a modification of the invention showing a ground engaging rotor adapted to partially support a cotton harvesting roller of the invention and also rotationally arranged to drive said roller;

FIG. 11 is a fragmentary view similar to FIG. 10, showing the modification of the structure disclosed therein;

FIG. 12 is a side elevational view similar to FIG. 4, but showing a modified means for partially supporting a cotton harvesting roller with respect to the surface of the ground;

FIG. 13 is a fragmentary sectional view taken from the line 13—13 of FIG. 12;

FIG. 14 is a fragmentary bottom plan view taken from the line 14—14 of FIG. 12; and FIG. 15 is an enlarged fragmentary sectional view taken from the line 15—15 of FIG. 12.

As shown in FIG. 1 of the drawings, a substantially conventional cotton harvesting vehicle 20 is provided with forward ground engaging wheels 22 and a rearward ground engaging wheel 24. The vehicle 20 may be any suitable vehicle of the cotton harvester type, such a conventional spindle machine used to harvest cotton from the stalks of cotton plants, or the vehicle 20 may be an auxiliary vehicle, as desired. The vehicle 20 is provided with a cotton collection basket 26 of conventional foraminous structure. This basket is supported on a frame 28 carried by the wheels 22 and 24. The frame 28 is provided with an extending frame portion 30 including a pair of spaced members 32 and 34, shown in FIGS. 2 and 4 of the drawings. These members 32 and 34 are interconnected by a cross member 36 having bracket portions 38 and 40 connected to opposite ends thereof. Extending through these brackets 38 and 40 are pivot pins 42 and 44, respectively, on which are pivotally mounted complemental brackets 46 and 48 which are interconnected by a cross member 50 which is movably mounted concentrially around the axes of the pins 42 and 44.

A tapered in cross section hollow vacuum conducting manifold 52 is substantially circular in cross section and this manifold is concentrically mounted with respect to the axes of the pins 42 and 44. The manifold 52 is rotatably mounted about its central axis by means of a swivel structure 54, shown in FIGS. 2 and 8 of the drawings. The swivel structure 54 comprises an outwardly directed annular flange 56 on the manifold 52 and a complemental flange 58 on a stationary manifold conduit section 60. A V-shaped in cross section annular clamp structure 62 surrounds the flange portions 56 and 58 and holds them concentrically aligned with each other and permits free rotative movement of the manifold section 52 with respect to the stationary manifold conduit portion 60. This conduit portion 60, as shown in FIGS. 1, 2 and 8 of the drawings, extends to an inlet of a centrifugal blower 62 having a rotor shaft 64 driven by means of pulleys 66 and 68 engaged by a belt 70. The pulley 66 being driven by an engine 72 is mounted on the frame 28. The blower 62 is provided with an outlet 74 communicating with the interior of the foraminous basket 26, all as will be hereinafter described in detail.

The blower 62 is a separate blower and independent relative to any blowers which are arranged in communication with a conduit 76 of the conventional cotton harvester vehicle 20.

Supported on the frame 28 is an actuating cylinder 78 of the pneumatic or hydraulic type. This cylinder is provided with a plunger 80 pivotally connected by a pin 82 with an upstanding lever 84 fixed to the cross member 50. The cross member 50 is, thus, power operated in an arcuate path about the axes of the pins 42 and 44, hereinbefore described. The cross member 50 is, thus, power operated to raise and lower cotton harvesting rollers relative to the ground and the manifold 52 is arranged to swivel about its joint 54 when the rollers are raised and lowered relative to the ground and as will be hereinafter described in detail.

It will be seen that the manifold 52 is provided with a plurality of inlet conduits 86 each of which may communicate with a vacuum conducting hood disposed over a cotton harvesting roller, as will be hereinafter described.

A plurality of cotton harvesting roller supporting struts 88 may be mounted on the bar in substantially aligned relation with the conduits 86 so that a plurality of cotton harvesting rollers may be supported in connection with the bar 50 either disposed to engage the ground or in elevated position in accordance with operation of the power cylinder 78, as hereinbefore described.

Each strut 88 may be a hollow tubular member having a bearing sleeve 90 freely pivotally mounted on the bar 50 and disposed between portions 92 and 94 of a yoke 96. These portions 92 and 94 being fixed on the bar 50 and the yoke 96 extends downwardly, as shown in FIG. 4 of the drawings, to engage a frontal side 98 of each strut 88 so that when the bar 50 is rotated about the axes of the pins 42 and 44, ground engaging rollers 100 may be elevated or lowered relative to the surface A of the ground, as shown in FIGS. 1 and 4 of the drawings.

It will be seen that the sleeve bearings 90 permit free pivotal movement of each strut 88 away from the portion 98 of each yoke 96 so that when each roller 100 passes over an elevated portion on the ground at the respective strut permits upward pivotal movement of the respective roller 100, as will be hereinafter described in detail.

In the structure, as shown in FIGS. 1, 2 and 4 of the drawings, a collar 102 is pivotally mounted on a lower portion of each strut 88 and movable about a substantially vertical axis, said collar being provided with elongated slots 104 operable about trunnions 106 projecting from opposite sides of each strut 88. These pins 106 retain the collars 102 axially on these struts 88 and permit relative rotation of each collar 102 about the substantially vertical axis of the strut 88.

A roller supporting fork 108 is provided to connect each collar 102 with each roller 100, as follows: the fork 108, as shown in FIGS. 4 and 14, is provided with free ends 110 carrying bearings 112 supporting opposite ends of a roller supporting shaft 114. Each fork 108 is provided with arm portions 116 pivoted on opposite sides of each sleeve 102 by means of a pin 118 which extends therethrough.

Each roller 100 is preferably a soft yieldable roller having a cross sectional shape adapted to substantially conform with the soil between a pair of cotton plant rows or between adjacent rows of cotton plant stalks. Each roller 100 is provided with cotton impaling elements 120 projecting from the periphery thereof. These cotton impaling elements 120 are preferably fibrous materials, such as nylon, various bristles or any other suitable impaling fiber which may be oriented in random direction or fibers which have ends directed, as will be hereinafter described.

Carried by the forks 108 are legs 121 extending upwardly at an angle to the vertical. Supported on these legs 121 in position over each roller 100 is a hood 122 having a vacuum conduit 124 communicating therewith. Each vacuum conduit 124 communicates through a universal joint assembly 126 with a respective conduit portion 86 of the manifold 52.

With reference to FIGS. 1 and 7 of the drawings, it will be seen that each conduit 124 is provided with a spherical socket portion 128 forming part of the universal joint 126, a slip joint section 130 of the universal joint assembly 126 is provided with a hollow spherical joint portion 132 held captive in the section 128, but freely pivotal in a universal direction therein, the section 130 is provided with a hollow cylindrical tubular portion 134 freely telescopically mounted and axially slidable in a telescopic section 136 of each manifold conduit section 86. Thus, the conduits 124 and 86 are flexibly coupled by the universal joint assembly 126 of each conduit section and are free telescopically to contract and extend in accordance with the telescopically slidable portions 134 and 136, hereinbefore described.

Each hood 122 is provided with a roller approach side 137 and an opposite roller escape side 138. The roller approach side 137 is provided with a tunnel 140 spaced from the periphery 142 of the respective roller 100. A soft resilient flap 144 tends to provide an air seal for the area between the interior of the tunnel 140 and the periphery 144 of the wheel, but this flap is very soft and resilient and may be drawn open by suction of air entering in the direction of arrows B in FIG. 9 of the drawings and also, this flap 144 may readily be deflected by cotton bolls C, being carried on cotton impaling elements 120, shown in FIG. 4. The extension of the tunnel 140 from the hood 122 provides a long tunnel area in which air induced to flow by vacuum in accordance with the direction of the arrows B tends to remove cotton bolls from the cotton impaling elements 120 so that the cotton bolls may be drawn through the respective conduit section 144, universal joint 126, vacuum conduit section 86, manifold 52 and conduit structure 60 through the blower 62 and outwardly through the conduit 74 and into the collection basket 26.

As shown in FIG. 6 of the drawings, the cotton impaling elements 120 are provided with cotton impaling ends 148 which are directed generally in the direction of roller rotation, as indicated by an arrow D in FIG. 4 of the drawings. Thus, the ends 148 are directed toward the roller approach side 136 and these pointed ends 148 are directed in the direction of air drawn into the hood 122 by partial vacuum therein through the tunnel 140, as indicated by arrows B in FIG. 4 of the drawings.

It will be seen that the roller approach side 137 is the side which the periphery of each respective roller 100 rotates toward, while the roller escape side 138 is the side of the hood 122 from which the periphery of the roller rotates as it leaves the hood.

At the roller escape side 138, a seal flap 150 is disposed in closely conforming relation with the periphery of the roller and with the impaling elements 148 to provide an air seal around the roller to thereby confine the inflow of air into the hood 122 so that a major portion of the air flow is forced to pass through the tunnel 140 and to thereby remove cotton bolls and fibers from the cotton impaling elements 120 as they pass through the tunnel and into the area of direct flow axially of the conduit 124.

As shown in FIGS. 1, 2 and 3, the strut 88 to which each roller 100 is connected is pivotally mounted on the bar 50 by means of the bearing sleeve 90 and the pick up yoke 96 is disposed to pick up each strut 88 and move it into an elevated broken line position, as shown in FIG. 1, so that the rollers 100 may be disengaged from the ground when not in use and during transport conditions.

When the rollers 100 are engaged with the ground and each strut is in substantially vertical position, a balance spring 152 tends to exert upward force to partially support the weight of each roller 100 and each duct section 124. This spring is interposed between a respective strut 88 and an arm 154 which is fixed to one of the arms 92 or 94, shown in FIG. 3, or may be fixed directly to the bar 50. Thus, the spring 152 may react against the arm 154 and tends slightly to raise the respective roller 100 so that the cotton impaling fiber elements 120 at their ends 148 tend to bear lightly on the ground so that they are not unduly deflected or depressed and so that they may readily impale bolls of cotton on the ground. Further, this spring balance arrangement provides a means by which the cotton inpaling elements 120 are not forced into the soil and, thus, prevent them from picking up undue amounts of dirt or other foreign matter.

A modification of the spring balance mechanism, shown in FIG. 4, comprises a tension spring 156 connected at its one end to a loop 158 on the sleeve bearing 90. The opposite end of the spring 156 being connected to an adjustable bolt 160 adjustably secured to one of the arms 120. Adjustment of the spring 156 may, thus, provide varying degrees of support for the roller 100 and the duct section 124 and permit relative pivotal movement of the fork 108 about the axis of the pin 118.

A further modification of the balance mechanism is shown in FIG. 12 of the drawings, wherein the forks 108 at the portions 116 extend backwardly and support a bar 162 on which a counterweight 154 is adjustably mounted and adjustably held in position by a set screw 166.

In both modifications, as shown in FIGS. 4 and 12, a pick up arm 168 mounted on the lower end of the sleeve 102 is engagable with a bottom portion of each fork structure 108 so that when a strut 88 is pivoted upwardly into the broken line positions, as shown in FIG. 1, the arm 168 bears on the lower side of each fork 108 and picks the fork and the respective roller 100 upwardly to a position above the ground for transport operation.

As shown in FIG. 5 of the drawings, each roller 100 is hollow and the shaft 114 is fixed to each roller and rotates in the bearings 112, hereinbefore described. Fixed to each shaft 114 are veins 170 which operate in liquid 172 carried inside the hollow roller 100.

As the roller rotates, the liquid 172 sloshes back and forth against the veins 170, as the veins rotate relative to the gravitationally attracted liquid. This causes oscillatory movement, as indicated by arrows F in FIG. 5 of the drawings, this oscillatory movement is a back and forth movement which causes the pointed ends 148 of the cotton impaling fibers 120 to be driven into the fibers of cotton bolls and to thereby anchor the fibers in the bolls so that they will be carried upwardly, as indicated at C in FIG. 4 of the drawings, and also in FIG. 9 of the drawings.

In the modification, as shown in FIG. 10 of the drawings, each fork 108 supports a roller 100 in a similar manner to that as disclosed in FIG. 4 of the drawings and each arm portion 110 of each fork 108 is extended to a common rotor mount portion 170 on which a caster 172 is pivotally mounted on a vertical axis. This caster 172 is provided with forks 174 in which a soil engaging rotor 176 is mounted. This rotor 176 is provided with peripheral teeth 178 disposed to obtain traction on the surface of the ground A. A flexible shaft 180 is connected to the rotor 178 and this shaft 180 drives a pinion 182 rotatably mounted on a bracket 184 carried by one of the fork arms 110. The pinion 182 meshes with a spur gear 186 fixed to the respective shaft 114 of the respective roller 100. It will be seen that the rotor 178 is smaller in diameter than the respective roller 100, consequently, the flexible shaft 180 drives the pinion 182 a greater number of revolutions than is accomplished by the roller 110 at ground driven speed. This ratio being comparable to the drive ratio between the pinion and the ring gear 186 so that the rotor 178 is, thus, geared to the roller 100 to drive it at approximately ground driven speed or slightly greater in one direction or the other, as desired. The rotor 178 supports the periphery of the roller 100 in such a manner that it is very lightly loaded with respect to the surface of the ground A and, thus, protects the cotton impaling elements 120 from undue stress, loading or wear with respect to the surface of the ground.

In the modification, as shown in FIG. 11, the mount portion 170 carries a vertical slight bearing 188 through which the caster shaft 172 is vertically slidable and rotatable. A spring 190 surrounds the caster shaft 172 and jam nuts 192 are screw threaded thereon and adjustable up and down on the shaft 172 to adjust the compression of the spring 190 and thereby adjust the relative elevation of the mount portion 170 of the forks 108 and also to correspondingly adjust the vertical disposition of the periphery of the roller 100 and the cotton impaling elements with respect to the surface of the ground A. Thus, the spring 190 acts as a load bearing balance device to adjust the peripheral loading of the roller 100 on the surface of the ground.

The flexible shaft 180, as shown in FIG. 11, operates in a similar manner to that described in connection with FIG. 10.

It will be seen that the mechanism disclosed generally in FIGS. 10 and 11, provide for the ground driving of each roller 100 by the rotor 176 and at speeds which may vary from ground driven speed and also that each rotor 176 provides precise vertical disposition control of the periphery of the respective roller 100 so that the peripheral loading of the roller and its cotton impaling elements 120 on the ground may be adjusted to a desired value so that the cotton impaling elements are not unduly compressed or crushed, this also alleviates wear, further, this balanced loading provides a facility for rotating the roller 100 in a manner to insure proper impaling of cotton bolls and fibers by means of the cotton impaling elements on the peripheries of the rollers 100.

It will be appreciated that in the event the roller 100 is rotated at a speed slightly greater than ground driven speed, that the ends 148 of the cotton impaling elements 120 will be driven into the cotton bolls resting on the ground and that they will, thus, be impaled by spearing them due to the driving of the periphery of the roller 100 at a slightly greater speed than ground speed, this being accomplished by actual traction of the rotor 176 and transmission of force thereby through the flexible shaft 180, pinion 182 and gear 186 to the roller 100.

It will be obvious to those skilled in the art that various modifications of the present invention may be resorted to in a manner limited only by a just interpretation of the following claims.

I claim:

1. In a cotton harvester the combination of: a roller adapted to roll adjacent the surface of the ground and between rows of cotton plants; cotton impaling elements secured to peripheral portions of said roller and disposed at an angle to a radial direction on the periphery of said roller; a vehicle frame; a roller support on which said roller is rotatably mounted; said roller support vertically movably mounted relative to said vehicle frame; and first means disposed and tending partially to bear the weight of said roller and roller support, whereby the periphery of said roller may bear lightly on the surface of the earth and on soft cotton bolls thereon; second means having a drive rotor engageable with the ground; and third means coupled with said drive rotor and said roller, whereby said roller may be driven rotatably by said drive rotor.

2. In a cotton harvester the combination of: a roller adapted to roll adjacent the surface of the ground and between rows of cotton plants; cotton impaling elements secured to peripheral portions of said roller and disposed at an angle to a radial direction on the periphery of said roller; a vehicle frame; a roller support on which said roller is rotatably mounted; said roller support vertically movably mounted relative to said vehicle frame; and first means disposed and tending partially to bear the weight of said roller and roller support, whereby the periphery of said roller may bear lightly on the surface of the earth and on soft cotton bolls thereon; second means coupled to said roller support and having a drive rotor engageably with the ground; and third means coupled with said drive rotor and said roller, whereby said roller may be driven rotatably by said drive rotor; said drive rotor rotatably mounted on said second means, said first means being resilient means disposed and tending to force said roller support upwardly and said drive rotor downwardly.

3. In a cotton harvester the combination of: a roller adapted to roll adjacent the surface of the ground and between rows of cotton plants; cotton impaling elements secured to peripheral portions of said roller and disposed at an angle to a radial direction on the periphery of said roller; a vehicle frame; a roller support on which said roller is rotatably mounted; said roller support vertically movably mounted relative to said vehicle frame; and first means disposed and tending partially to bear the weight of said roller and roller support, whereby the periphery of said roller may bear lightly on the surface of the earth and on soft cotton bolls thereon; said first means being a ground engaging rotor engageable with the ground, said ground engaging rotor rotatably mounted on said roller support, said ground engaging rotor being, thus, disposed partially to support said roller relative to the ground.

4. In a cotton harvester the combination of: a roller adapted to roll adjacent the surface of the ground and between rows of cotton plants; cotton impaling elements disposed at an angle to a radial direction and carried on the periphery of said roller; a vehicle frame; a roller support on which said roller is rotatably mounted; said roller support vertically movably mounted relative to said vehicle frame; said roller being hollow; vein means in said roller; liquid in said hollow roller adapted to react and slosh against said vein means and the inner surfaces of said hollow roller to thereby tend reactively to rotatably oscillate said roller backwardly and forwardly around its axis with respect to its rotative direction, whereby said impaling elements are caused to penetrate cotton bolls in directions at an angle to the vertical.

5. In a cotton harvester the combination of: a roller adapted to roll adjacent the surface of the ground and between rows of cotton plants; cotton impaling elements secured to peripheral portions of said roller and disposed at an angle to a radial direction on the periphery of said roller; a vehicle frame; a roller support on which said roller is rotatably mounted; said roller support vertically movably mounted relative to said vehicle frame; and first means disposed and tending partially to bear the weight of said roller and roller support, whereby the periphery of said roller may bear lightly on the surface of the earth and on soft cotton bolls thereon; said cotton impaling elements having impaling ends pointed in a direction of rotation at the periphery of said roller; a hollow pick-off hood adjacent a peripheral portion of said roller; means for applying a partial vacuum in said hood, whereby cotton bolls are drawn off said ends of said impaling elements and into said hood in a direction in which said ends are pointed as they approach said hood occasioned by rotation of the periphery of said roller relative to said hood; a tunnel portion of said hood spaced from said periphery at a side of said hood toward which said periphery rotates, said tunnel portion spaced from said periphery and said impaling elements a distance sufficient to admit cotton bolls to be moved through said space between said periphery and said tunnel portion; a resilient flap connected to said tunnel portion and extending toward said periphery and adapted to be deflected by cotton bolls carried on said impaling elements.

6. In a cotton harvester the combination of: a roller adapted to roll adjacent the surface of the ground and between rows of cotton plants; cotton impaling elements secured to peripheral portions of said roller and disposed at an angle to a radial direction on the periphery of said roller; a vehicle frame; a roller support on which said roller is rotatably mounted; said roller support vertically movably mounted relative to said vehicle frame; and first means disposed and tending partially to bear the weight of said roller and roller support, whereby the periphery of said roller may bear lightly on the surface of the earth and on soft cotton bolls thereon; a hollow pickoff hood adjacent a peripheral portion of said roller; means for applying a partial vacuum in said hood, whereby cotton bolls are drawn off said ends of said impaling elements and into said hood; a tunnel portion of said hood spaced from said periphery at a side of said hood toward which said periphery rotates relative to said hood, said tunnel portion spaced from said periphery and said impaling elements a distance sufficient to admit cotton bolls to be moved freely between said tunnel portion and the periphery of said roller; a resilient flap connected to said tunnel portion and extending toward said periphery and adapted to be deflected by cotton bolls carried on said impaling elements.

7. In a cotton harvester the combination of: a roller adapted to roll adjacent the surface of the ground and between rows of cotton plants; cotton impaling elements disposed at an angle to a radial direction of said roller, said impaling elements carried on the periphery of said roller; a vehicle frame; a roller support on which said roller is rotatably mounted, said roller support vertically movably mounted relative to said vehicle frame; a lifting frame carrying said roller support; a substantially horizontal axis pivot means mounted on said vehicle frame; a vacuum manifold axially aligned with said horizontal axis pivot means and carried by said vehicle frame; a swivel section in said manifold disposed to permit rotation of a portion of said manifold relative to said vehicle frame on said horizontal axis pivot means; a hollow vacuum conducting conduit connected to said manifold and communicating with the interior thereof; a hood connected to said conduit and disposed in adjacent spaced relation to the periphery of said roller and adapted vacuumatically to remove cotton from the periphery thereof.

8. In a cotton harvester the combination of: a roller adapted to roll adjacent the surface of the ground and between rows of cotton plants; cotton impaling elements disposed at an angle to a radial direction of said roller, said impaling elements carried on the periphery of said roller; a vehicle frame; a roller support on which said roller is rotatably mounted, said roller support vertically movably mounted relative to said vehicle frame; a lifting frame carrying said roller support; a substantially horizontal axis pivot means mounted on said vehicle frame; a vacuum manifold axially aligned with said horizontal axis pivot means and carried by said vehicle frame; a swivel section in said manifold disposed to permit rotation of a portion of said manifold relative to said vehicle frame on said horizontal axis pivot means; a hollow vacuum conducting conduit connected to said manifold and communicating with the interior thereof; a hood connected to said conduit and disposed in adjacent spaced relation to the periphery of said roller and adapted vacuumatically to remove cotton from the the periphery thereof; said roller support pivoted to said lifting frame on a substantially horizontal axis; and a telescopic slip joint means in said conduit to permit relative telescopic shortening thereof when said roller support is pivoted upwardly relative to said lifting frame.

9. In a cotton harvester the combination of: a roller adapted to roll adjacent the surface of the ground and between rows of cotton plants; cotton impaling elements disposed at an angle to a radial direction of said roller, said impaling elements carried on the periphery of said roller; a vehicle frame; a roller support on which said roller is rotatably mounted, said roller support vertically movably mounted relative to said vehicle frame; a lifting frame carrying said roller support; a substantially horizontal axis pivot means mounted on said vehicle frame; a vacuum manifold axially aligned with said horizontal axis pivot means and carried by said vehicle frame; a swivel section in said manifold disposed to permit rotation of a portion of said manifold relative to said vehicle frame on said horizontal axis pivot means; a hollow vacuum conducting conduit connected to said manifold and communicating with the interior thereof; a hood connected to said conduit and disposed in adjacent spaced relation to the periphery of said roller and adapted vacuumatically to remove cotton from the periphery thereof; said roller support pivoted to said lifting frame on a substantially horizontal axis; and a telescopic slip joint means in said conduit to permit relative telescopic shortening thereof when said roller support is pivoted upwardly relative to said lifting frame; means carried by said lifting frame and disposed to engage said roller support to limit downward pivotal movement of said roller support relative to siad lifting frame and to permit said lifting frame to pick up said roller and roller support when pivoted about said horizontal axis pivot means.

10. In a cotton harvester the combination of: a roller adapted to roll adjacent the surface of the ground and between rows of cotton plants; cotton impaling elements disposed at an angle to a radial direction of said roller, said impaling elements carried on the periphery of said roller; a vehicle frame; a roller support on which said roller is rotatably mounted, said roller support vertically movably mounted relative to said vehicle frame; a lifting frame carrying said roller support; a substantially horizontal axis pivot means mounted on said vehicle frame; a vacuum manifold axially aligned with said horizontal axis pivot means and carried by said vehicle frame; a swivel section in said manifold disposed to permit rotation of a portion of said manifold relative to said vehicle frame on said horizontal axis pivot means; a hollow vacuum conducting conduit connected to said manifold and communicating with the interior thereof; a hood connected to said conduit and disposed in adjacent spaced relation to the periphery of said roller and adapted vacuumatically to remove cotton from the periphery thereof; said roller support pivoted to said lifting frame on a substantially horizontal axis; and a telescopic slip joint means in said conduit to permit relative telescopic shortening thereof when said roller support is pivoted upwardly relative to said lifting frame; means carried by said lifting frame and disposed to engage said roller support to limit downward pivotal movement of said roller support relative to said lifting frame and to permit said lifting frame to pick up said roller and roller support when pivoted about said horizontal axis pivot means; and power operated means on said vehicle frame and connected to said lifting frame for pivoting it upwardly about said horizontal axis pivot means.

References Cited

UNITED STATES PATENTS

| | | | |
|---|---|---|---|
| 1,650,796 | 11/1927 | Kellogg | 56—328 |
| 1,836,128 | 12/1931 | Palmer | 56—14 |
| 2,674,075 | 4/1954 | Snow | 56—11 |
| 2,780,904 | 2/1957 | Bowie et al. | 56—328 |
| 2,896,398 | 7/1959 | Green | 56—48 |
| 3,040,505 | 6/1962 | De Tuncq et al. | 56—28 |
| 3,101,581 | 8/1963 | Kelso et al. | 56—28 |
| 3,105,340 | 10/1963 | Hewitt | 56—48 |
| 3,108,418 | 10/1963 | Henderson | 56—28 |
| 3,117,405 | 1/1964 | Clare | 56—11 |
| 3,270,490 | 9/1966 | Nisbet | 56—28 |

ABRAHAM G. STONE, *Primary Examiner.*

RUSSELL R. KINSEY, *Examiner.*